United States Patent Office

2,789,055
Patented Apr. 16, 1957

2,789,055

PROCESS FOR IMPROVING THE PALATABILITY OF SOYA BEANS

Ralph E. Blatt, Los Angeles, Calif.

No Drawing. Application April 29, 1955,
Serial No. 505,030

8 Claims. (Cl. 99—98)

The present invention relates to the preparation of a palatable product from soya beans.

It is an object of the present invention to provide an economical procedure for preserving the highly nutritive content of the soya bean.

Another object of the present invention is to obtain such highly nutritive content while, at the same time, enhancing the palatability of the soya bean.

It is a further object of the present invention to remove the objectionable taste or after-taste from the soya bean.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the whole soya beans are placed into a pressure vessel, such as a conventional autoclave. The autoclave has an opening at the top closed by a suitable valve through which the soya beans may be inserted and a hole at the bottom closed by a valve through which the soya beans may be removed at the conclusion of the treatment. Surrounding the autoclave, there is a jacket through which water, steam or other conventional heating means can be applied to the outer walls of the autoclave. The autoclave also has an inlet through which nitrous oxide can be introduced. Preferably, this inlet is near the top of the autoclave, but it can also be positioned near the bottom or elsewhere. The top of the autoclave is also equipped with a bleed off valve, whose function will be described later. Further, the autoclave is equipped with a vacuum outlet attached to a vacuum pump. The vacuum line is, likewise, closed by a suitable valve. An autoclave having an inside diameter of about 7 inches with a length about 5 times its diameter has been found convenient. Preferably, the autoclave has a sieve extending around the inner wall thereof and positioned ½ inch from said inner walls. The sieve is preferably made of stainless steel and has holes of 1/64 inch or less diameter. The purpose of the sieve is to avoid condensation on the walls of the autoclave and to permit even circulation of the atmosphere within the autoclave.

According to the process, soya beans are admitted to the autoclave in an amount sufficient to fill about 9/10 of the capacity within the sieve. This is not particularly critical and smaller loads can be employed, although with obviously less efficiency for the apparatus. After the whole soya beans are introduced into the autoclave, all the valves are closed and then the valve to the vacuum pump is opened and the vessel is evacuated to a pressure of 100 mm. or less. It is desirable that the pressure be 15 mm. or less and, preferably, 8.2 mm. or less, in order to obtain the best results.

Prior to or simultaneously with the creation of the vacuum, heating fluid is introduced into the jacket, e. g., steam, to maintain a temperature of between about 120° F. and about 136° F. At a temperature below 120° F., not enough moisture will come out of the cells in a reasonable time while, at a temperature above 136° F., there may be undesirable destruction of portions of the beans. The exact time of the vacuum treatment is not critical and it can vary from 5 to 15 minutes and longer, the critical feature being that the vacuum is employed for a sufficient time to remove substantially all excess moisture.

The valve to the vacuum pump is then closed and the valve to the source of nitrous oxide is opened and nitrous oxide gas is then admitted to the vessel until a pressure between about 65 and 130 p. s. i. gauge is obtained. It has been found that the use of nitrous oxide is critical to the success of the present invention. Satisfactory results have not been obtained with other gases, such as air, oxygen, nitrogen, hydrogen, carbon dioxide and water vapor, when they are used alone. It is evident, however, that small amounts of such gases may be used as diluents for the nitrous oxide.

The nitrous oxide, preferably, is not admitted continuously, but rather is admitted intermittently through a clock valve, such as a ¼ sec. stop clock valve, in order to facilitate the shaking of the beans which has been found necessary to obtain optimum results while, at the same time, dispensing with the necessity of employing conventional rotating and stirring device. It is essential that the pressure be superatmospheric, but the range of 65 to 130 p. s. i. gauge is not especially critical. When the pressure reaches the desired value, the bleeder valve comes into operation and permits removal of the nitrous oxide as well as any other gases which are formed during the treatment, so that the pressure remains substantially constant. The soya beans are left in the autoclave at this elevated temperature and pressure for about 20 to 35 minutes. The exact time is not critical but, as will be appreciated, is dependent to some extent on the particular temperature and pressure employed.

Upon completion of the above procedure, the soya beans are released from the pressure and transmitted to a conventional hot press oil extractor. It is necessary to remove the oil immediately after the soya beans have completed the above process, in order to make the final product satisfactory as a food. As a result of the above process, including the removal of the oil, the soya beans are free from objectionable taste or toxins, and are ready for conventional processing to diversified human and animal foodstuffs.

A specific example, illustrating the present invention, is as follows:

Whole soya beans are introduced into the above described autoclave to 9/10 of the sieve capacity. The autoclave was previously heated to a temperature of about 130° F. and this temperature was maintained throughout the autoclaving by use of superheated steam in the heating jacket. A vacuum was then applied to give an absolute pressure of 8.2 mm. and the vacuum was then continued for 12 minutes. The valve to the vacuum pump was then shut and nitrous oxide introduced through the intermittent valve previously mentioned and the pressure rose to 110 to 112 p. s. i. gauge, which pressure was maintained for 31 minutes with the aid of the bleed-off valve previously mentioned. The soya beans were then removed from the autoclave and immediately introduced into a press-oil extractor maintained at about 212° F. to remove substantially all of the oil content by quick action, e. g., 30 sec. preferably. The soya bean product was then ready for use.

I claim:

1. A process for improving the palatability of soya beans comprising subjecting the beans to a subatmospheric pressure at an elevated temperature up to 136° F. until substantially all excess moisture is removed and then subjecting them to the action of a gas comprising nitrous oxide at an elevated temperature up to 136° F. and a superatmospheric pressure.

2. The process of claim 1, including the further step of expressing the oil from the soya beans.

3. A process according to claim 1, wherein the vacuum treatment is carried out at a pressure not over about 100 mm. and wherein the superatmospheric pressure treatment is carried out at not less than 65 p. s. i. gauge.

4. A process according to claim 3, wherein the temperature of the reaction is between about 120 and 136° F.

5. The process of claim 4, wherein immediately after the end of the vacuum treatment, the soya beans are subjected to an expressing treatment which removes substantially all of the oil.

6. A process according to claim 4, in which the vacuum treatment is carried out at a pressure not over about 15 mm., the vacuum treatment is continued for a time sufficient to remove substantially all of the moisture, the superatmospheric pressure treatment is carried out at a temperature of about 120 to 136° F. and a pressure of about 65 to 130 p. s. i. gauge for a time of about 20 to 35 minutes.

7. A process according to claim 6, where immediately after the autoclave treatment substantially all of the oil is removed quickly in a hot press.

8. A process for improving the palatability of soya beans comprising subjecting the beans to subatmospheric pressure until substantially all excess moisture is removed at a temperature of 120–136° F. and then subjecting them to the action of a gas comprising nitrous oxide at a temperature between 120 and 136° F. and at a superatmospheric pressure.

References Cited in the file of this patent
UNITED STATES PATENTS

| | | |
|---|---|---|
| 1,538,369 | Akiyama | May 19, 1925 |
| 1,867,541 | Shellabarger | July 12, 1932 |
| 1,936,281 | Winkler et al. | Nov. 21, 1933 |
| 2,147,097 | Horwath | Feb. 14, 1939 |
| 2,148,142 | Wait | Feb. 21, 1939 |
| 2,294,172 | Getz | Aug. 25, 1942 |